United States Patent [19]
Ancessi

[11] Patent Number: 5,838,823
[45] Date of Patent: Nov. 17, 1998

[54] VIDEO IMAGE COMPRESSION AND DECOMPRESSION

[75] Inventor: Laurent Ancessi, Vancouver, Canada

[73] Assignee: Electronic Arts, Inc., San Mateo, Calif.

[21] Appl. No.: 609,867

[22] Filed: Feb. 29, 1996

[51] Int. Cl.[6] .............................. G06K 9/36; H04N 1/41; H04N 1/415

[52] U.S. Cl. ................... 382/232; 382/236; 382/239; 382/245; 358/426; 358/433; 358/443; 348/400; 348/401

[58] Field of Search .................................. 382/232, 236, 382/239, 235, 244, 245, 246; 358/426, 433, 443; 348/400, 401, 402, 409, 412, 415

[56] References Cited

U.S. PATENT DOCUMENTS

| | | | |
|---|---|---|---|
| 5,091,782 | 2/1992 | Krause et al. | 348/402 |
| 5,117,287 | 5/1992 | Koike et al. | 358/133 |
| 5,194,950 | 3/1993 | Murakami et al. | 358/133 |
| 5,231,485 | 7/1993 | Israelsen et al. | 358/133 |
| 5,249,053 | 9/1993 | Jain | 348/402 |
| 5,377,018 | 12/1994 | Rafferty | 358/433 |
| 5,434,622 | 7/1995 | Lim | 348/400 |
| 5,467,413 | 11/1995 | Barrett | 382/236 |
| 5,594,503 | 1/1997 | Miyazawa | 348/414 |

*Primary Examiner*—Edward L. Coles
*Assistant Examiner*—Mark Wallerson
*Attorney, Agent, or Firm*—Fenwick & West LLP

[57] ABSTRACT

A video image compression and decompression system and method operates on frame blocks and uses multiple compression stages to select a best compression method for use with the associated block. The best compression method is selected by performing motion compensation compression on each block and assigning a quantitative image quality rating to the compressed block. During a second compression stage, the blocks having the lowest image quality ratings are selected and compressed using a vector quantization method which improves the quality of the block representation thereby improving the overall image quality. During each compression stage, compression dictionaries are built and dynamically updated. After the compression method is selected for each block, a compressed image frame is built.

7 Claims, 7 Drawing Sheets

VIDEO IMAGE COMPRESSION AND DECOMPRESSION

BACKGROUND OF THE INVENTION

1. Field of the Invention

The invention relates generally to a video image compression system and method and more particularly to a system and method for compressing video images by combining a plurality of video compression techniques.

2. Description of the Related Art

The use of digital video is growing in many application areas including computer games, other entertainment areas, education and business. Digital video produces motion by displaying a sequence of video frames, generally at a rate of at least 15 frames per second. Each digital video frame contains a specific number of picture elements (pixels). For example, one conventional digital video frame size is 320 pixels by 240 pixels. In the case of gray scale video sequences, each pixel is typically represented by an 8 bit integer. In the case of color video sequences, each pixel is typically represented by a 24 bit integer (8 bits for each of the red, blue and green color planes). Thus, the amount of data associated with digital video sequences can be enormous. Data compression techniques, however, can be used to reduce the storage requirements, to reduce video storage costs and to decrease video transmission bandwidth. Data compression techniques also provide the benefit of increasing the maximum number of frames which can be stored on a fixed size storage medium such as a conventional compact disk.

There are two types of conventional compression techniques: lossy and lossless. Lossless compression techniques, also called coding techniques, compress and decompress each image frame without the loss of any pixel data. When using lossless compression techniques, the image frame can be decompressed without degrading the visual quality of the image. Lossy techniques, in contrast, suffer a loss of image information and result in a decrease in the quality of the image on decompression (image reproduction).

Certain conventional lossy image compression techniques achieve either better reproduction quality or better compression ratios on images having certain visual attributes. For example, one lossy compression technique, the vector quantization technique, works best when compressing images having limited color palettes, or having regions with limited color palettes. Another lossy compression technique, motion compensation compression, achieves better compression ratios and reproduction quality when portions of the image on a frame are translated portions of a previous frame.

Thus, some portions of a video frame have visual attributes that are better suited for one type of lossy compression as compared to another. Therefore, if a single compression technique is applied to each image frame in a video, it is possible that a better compression ratio could be achieved to deliver the same reproduction quality for that image. Another possible result is that some portions of the image may have a degraded reproduction quality as compared to other portions better suited to the applied lossless compression technique.

It is desirable to use a compression and decompression method which yields a homogeneous image after decompression. A homogeneous image is one having a consistent reproduction quality across the image. When an image is not homogeneous, the areas that have a particularly degraded reproduction quality attract an observer's attention more readily than the better reproduced areas.

Thus, there is a need for an efficient video image compression system and method that will compress images and produce a homogeneous effect across each frame on decompression.

SUMMARY OF THE INVENTION

In accordance with the present invention, there is provided an efficient video image compression and decompression system and method that compresses video frames and produces a homogeneous image across each frame on decompression. Compression is performed by first retrieving a video frame comprising a plurality of pixel data. The retrieved video frame is next subdivided into blocks of 16 pixels comprising 4×4 pixel groups. Each block of the retrieved video frame is compressed using a first lossy compression technique during a first lossy compression stage. In the preferred embodiment, the first lossy technique is a motion compensation compression method which uses a dictionary of motion vectors constructed during the first lossy compression stage. The motion vector dictionary is preferably populated with an optimal set of motion vectors.

An image quality rating (compression quality rating) is additionally computed for each block. The image quality rating quantifies the difference between the compressed version (representation) of the block and the original uncompressed block. Preferably, the image quality is calculated using a sum of the squares error measure.

After the first lossy compression stage is completed for each block, the compression ratio preferably exceeds a targeted (desired) compression ratio. Because the targeted compression ratio is exceeded, the second lossy compression stage is applied to expand the compressed frame representation to improve the image quality of selected blocks. Preferably, the second lossy compression stage is performed on blocks having the lowest quality ratings to improve their image quality thereby improving overall image quality and image consistency. Thus, in accordance with the present invention, second stage lossy compression is performed on blocks having the poorest image quality ratings until the targeted compression ratio is met or until a threshold minimum image quality is reached. In the preferred embodiment, the threshold minimum image quality is an image quality corresponding to an error measure of zero.

In the preferred embodiment, the second lossy compression stage uses vector quantization having a literal 4 dictionary and a literal 16 dictionary. Both the literal 4 and the literal 16 dictionaries are constructed during the second lossy compression stage to populate the dictionaries with an optimal set of elements.

DESCRIPTION OF THE PREFERRED EMBODIMENT

Figure 1A:
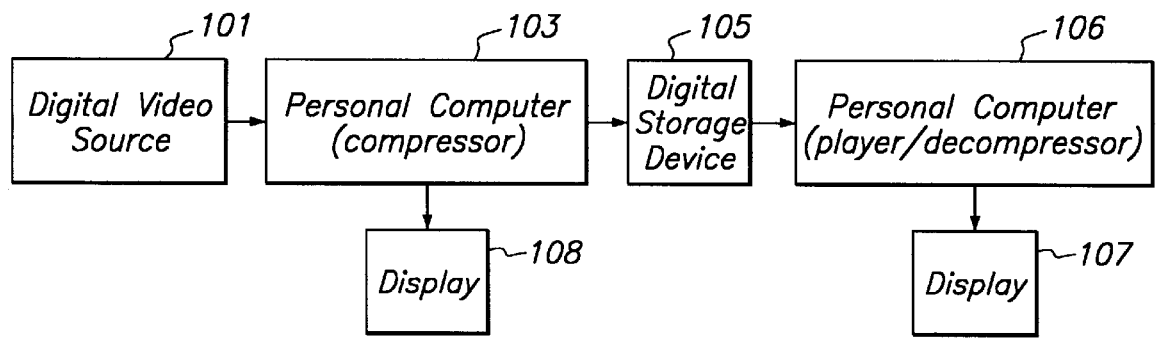
FIG. 1A is a functional block diagram of a compression and decompression system for implementing the method of the present invention.

There is illustrated in FIG. 1A, a functional block diagram of a system 100 in accordance with the present invention. System 100 has a digital video source 101 for generating a video frame sequence. Digital video source 101 is any digital video generation device such as a video digitizer, a video editor, animation hardware, or a video storage device and the like. The video frame sequence (frame sequence) generated by digital video source 101 is preferably a series of consecutive video frames. Each frame of the frame sequence is a digital image and collectively form a video segment.

Digital video source 101 is coupled to a personal computer 103. Personal computer 103 is a general purpose personal computer such as a Macintosh computer manufactured by Apple Computer, Inc. of Cupertino, Calif. or an IBM or IBM compatible personal computer programmed to implement the compression method of the present invention. When programmed to implement the compression method of the present invention, personal computer 103 receives and compresses the frame sequence received from digital video source 101 to generate a compressed frame sequence. Personal computer 103 has an output coupled to a digital storage device 105. Preferably the compressed frame sequence is written to and stored on a portable digital storage device such as a read only memory in the form of a compact disk (a CD ROM). Thus, in a preferred embodiment, digital storage device 105 is a CD ROM. In accordance with the present invention, the digital storage device 105 is coupled to a video player such as a personal computer 106 programmed to decompress and play the compressed frame sequence. Thus, the original frame sequence is recovered using a compatible video player such as personal computer 106 programmed to decompress the compressed frame sequence in accordance with the present invention and display the decompressed video sequence on a display device 107 which is coupled to personal computer 106.

Personal computer 103 may additionally or alternatively store the compressed frame sequence on an internal hard disk or other internal storage medium for decompression and playback on personal computer 103 and display device 108.

Figure 1B:
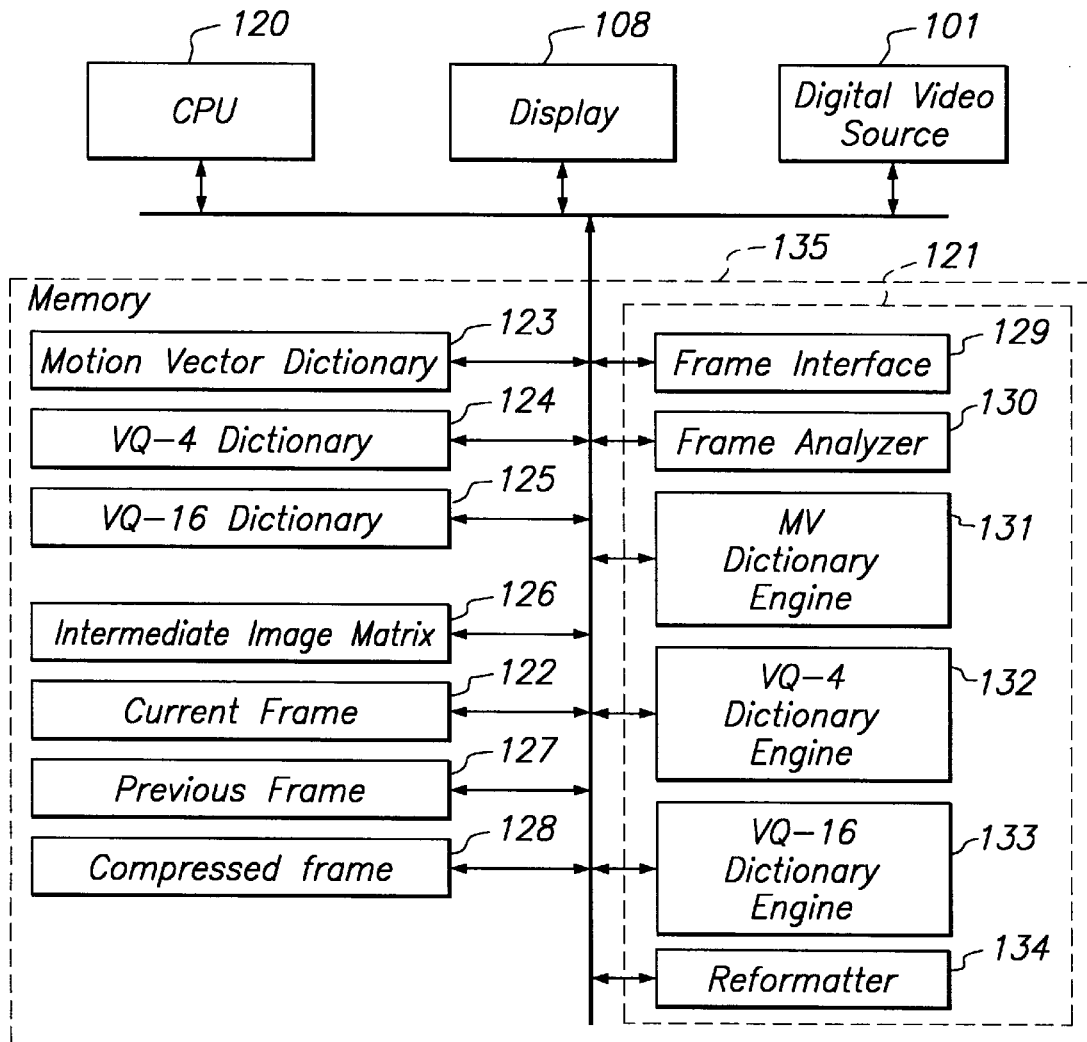
FIG. 1B is a functional block diagram of a computer programmed to implement the method of the present invention.

FIG. 1B shows a block diagram of personal computer 103 programmed to compress a frame sequence in accordance with the present invention. A central processing unit (CPU) 120 couples with display 108, digital video source 101 and memory 135. Memory 135 stores program code 121, compression dictionaries 123, 124 and 125, a current frame 122, a previous frame 127, an intermediate image matrix 126 and compressed frame 128. Program code 121 includes a frame interface 129, frame analyzer 130, dictionary engines 131, 132 and 133 and reformatter 134. Frame interface 129 retrieves an image frame for compression and stores the retrieved frame as current frame 122. Frame analyzer 130 performs the compression method of the present invention using dictionary engines 131, 132 and 133 to build compression dictionaries 123, 124 and 125, respectively, which are optimized for compressing current frame 122.

In the exemplary embodiment, the compression dictionaries include motion vector dictionary 123, vector quantization-4 dictionary (VQ-4 dictionary) 124 and vector quantization-16 dictionary (VQ-16 dictionary) 125. Motion vector dictionary 123 is populated with two element motion vectors, VQ-4 dictionary 124 is populated with literal-4 entries and VQ-16 dictionary 125 is populated with literal-16 entries. Literal-4s are entries confined to a color palette having only four colors while literal-16 entries have a color palette having a sixteen colors. Each compression dictionary 123, 124 and 125 additionally stores a popularity rating (not illustrated) for each entry. The popularity rating indicates the number of image blocks currently tagged to the associated entry. The popularity ratings are updated as program code 121 adds and deletes dictionary entries (and updates the intermediate image matrix 126 as discussed below) during the build of the compression dictionaries.

During the build of compression dictionaries 123, 124 and 125, frame analyzer 130 constructs an intermediate image matrix 126 which stores, for each pixel block, a block identifier, the associated compression information (including the compression method and an index to the dictionary entry) and an image quality rating. Preferably, the block identifier is stored implicitly in the intermediate matrix data structure. For example, the first set of entries in the intermediate image matrix corresponds to the first block, the set of second entries corresponds to the second block and so forth. The image quality rating is a quantitative measure of how well the associated block is represented by the corresponding dictionary entry. After compression dictionaries 123, 124 and 125 are built and intermediate image matrix 126 is constructed, reformatter 134 reformats the information stored in intermediate image matrix 126 and each of the compression dictionaries to generate a compressed frame 128.

Referring now again to FIG. 1A, in accordance with the present invention, each frame of the frame sequence generated by digital video source 101 has an associated frame header. The frame header contains a target compression value which has been selected for the associated frame. A target compression value of 10% indicates that an image compression ratio of 10:1 is specified for the associated frame. A compression value of 25% indicates that a compression ratio of 4:1 is desired and so forth. A compression value of 100% indicates that the frame is a key frame and thus no lossy compression is to be performed.

Preferably, the first frame of each video sequence is designated a key frame. Additional key frames are designated by any one of a number of methods including: (i) manual selection by someone familiar with the lossy compression techniques used in the present method; (ii) periodic key frame designation every Nth frame, for example every 20th frame; or (iii) measuring changes in the color palette of the frames and designating frames that have a sufficiently different color palette from the previous frame or frame group.

I. COMPRESSION

Figure 2:
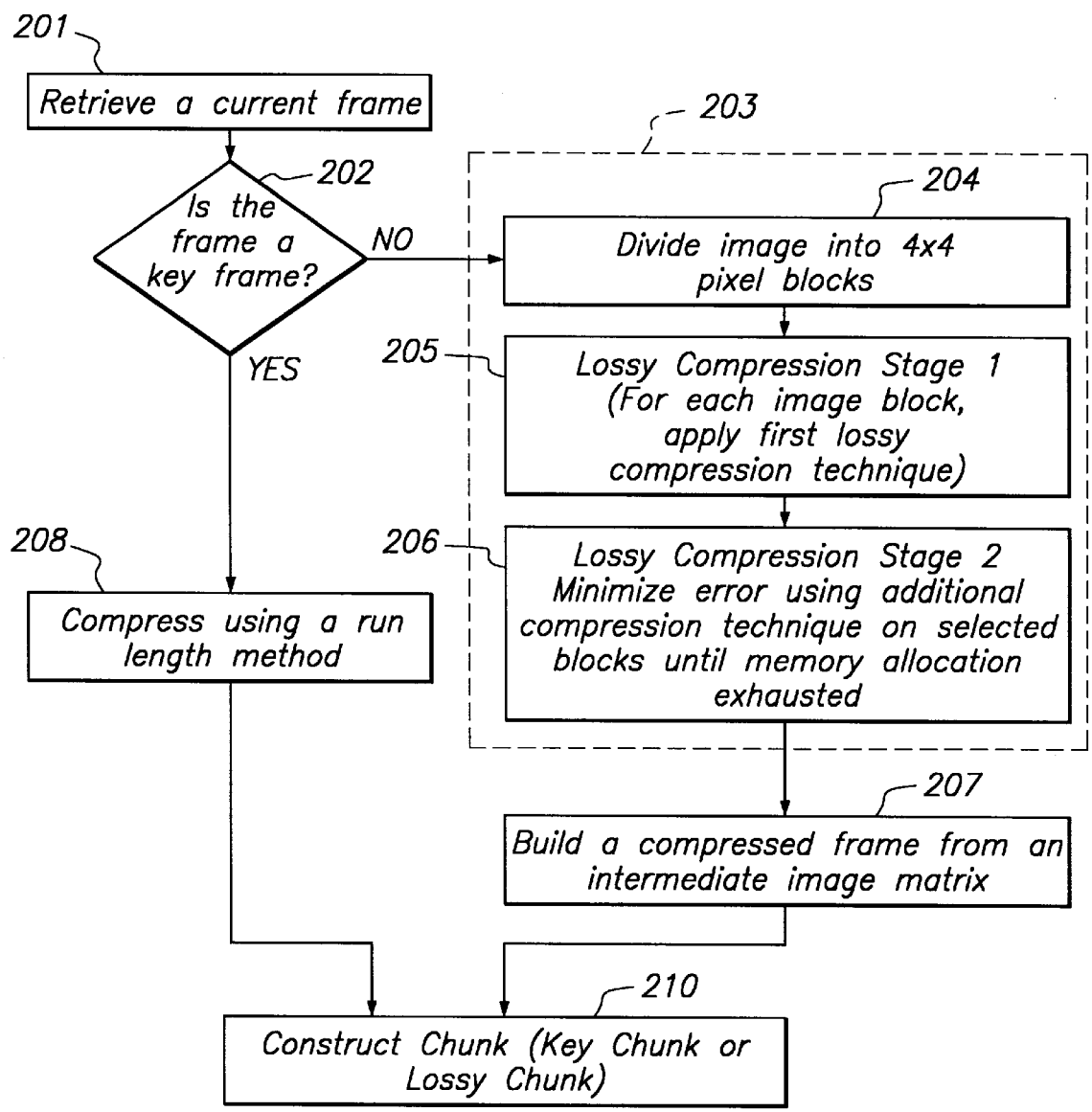
FIG. 2 is a flow diagram of a two stage compression method in accordance with the present invention.

There is illustrated in FIG. 2, a flow diagram of a compression method of the present invention. In accordance with the method, system 100 first retrieves 201 a current frame for compression. Retrieving step 201 includes retrieval of the frame header as well as the pixel data. System 100 next performs a testing step 202 to determine whether the retrieved frame is a key frame. Preferably, system 100 decodes the target compression value stored in the frame header to determine whether the current frame is a key frame. For example, a target compression value of 100% indicates that the current frame is a key frame and a target compression value of less than 100% means that the frame is not a key frame. If test step 202 determines that the current frame is a key frame, then no lossy compression is performed and the method proceeds to compression step 208. Compression step 208 performs a lossless compression technique on the key frame, such as a run length compression technique. After performing compression step 208, the method proceeds to constructing step 210, discussed below.

Now referring back to test step 202, if test step 202 determines that the current frame is not a key frame, the method proceeds to lossy compression step 203 to reduce the frame storage requirements by the specified compression ratio.

Figure 3:
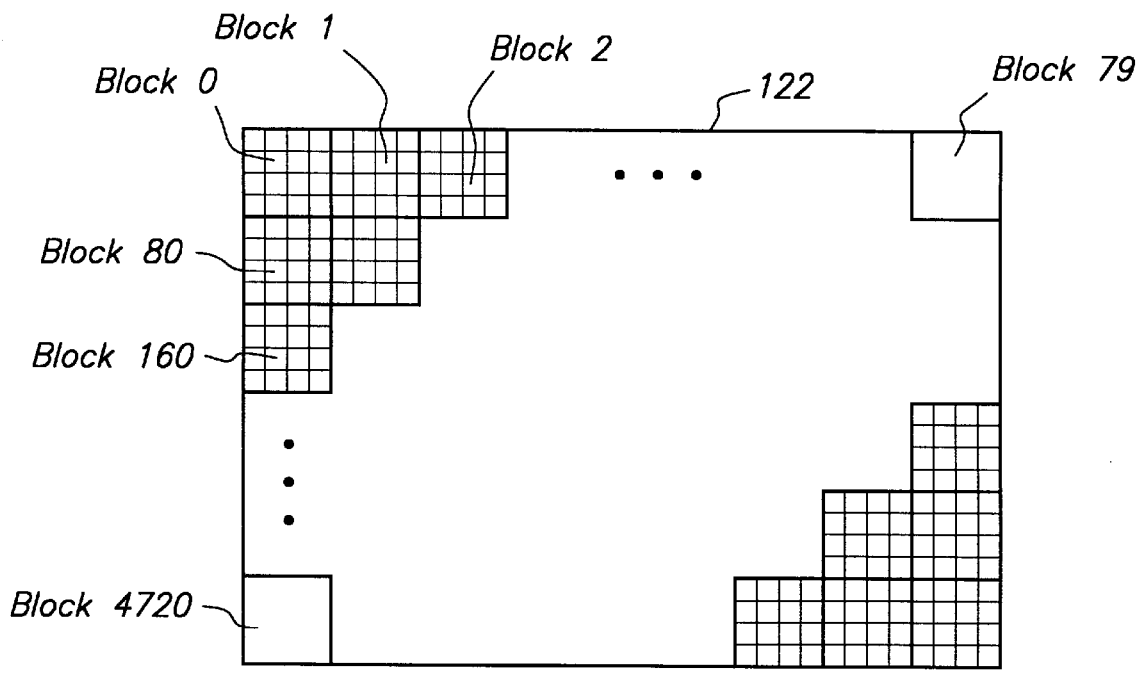
FIG. 3 is a pictorial illustration of a video frame having pixels grouped into 16 pixel blocks in accordance with the present invention.

Lossy compression step 203 includes a first lossy compression stage 205 and a second lossy compression stage 206. Both lossy compression stages 205 and 206 operate on blocks of pixels and therefore, lossy compression step 203 initially performs dividing step 204. Preferably, dividing step 204 divides the current frame into blocks of 16 pixels organized in a 4×4 grid. FIG. 3 illustrates a current frame 122 divided into pixel blocks, called "blocks" or "frame blocks" in accordance with the present invention. Although in the illustrated embodiment, the blocks are square, other block shapes such as rectangular, diamond, parallelogram or arbitrarily shaped blocks may alternatively be used. In the preferred embodiment, each frame is 320 pixels by 240 pixels and therefore, is divided into 4800 blocks (80 blocks by 60 blocks).

Referring now again to FIG. 2, after performing dividing step 204, system 100 performs first lossy compression stage 205 followed by a second lossy compression stage 206 which are described below.

First Stage Lossy Compression

In accordance with the present method, first lossy compression stage 205 applies a first lossy compression technique to each block of the current frame. In the preferred embodiment, the first lossy compression technique is a motion compensation compression technique whereby a dictionary of two element motion vectors are used to represent each block. Other lossy compression techniques such as wavelet compression or discrete cosine transform techniques (including MPEG and JPEG) could alternatively be selected as the first lossy compression technique.

In the exemplary embodiment, system 100 builds a motion vector dictionary and then assigns, to each block, the dictionary entry which best represents the block. Each motion vector dictionary entry is a two element motion vector (displacement vector) in pixel units. The two element motion vector indicates the relative horizontal and vertical displacement in pixel units of each block of the current frame as compared to the 4×4 pixel group of the previous frame.

Figure 4:
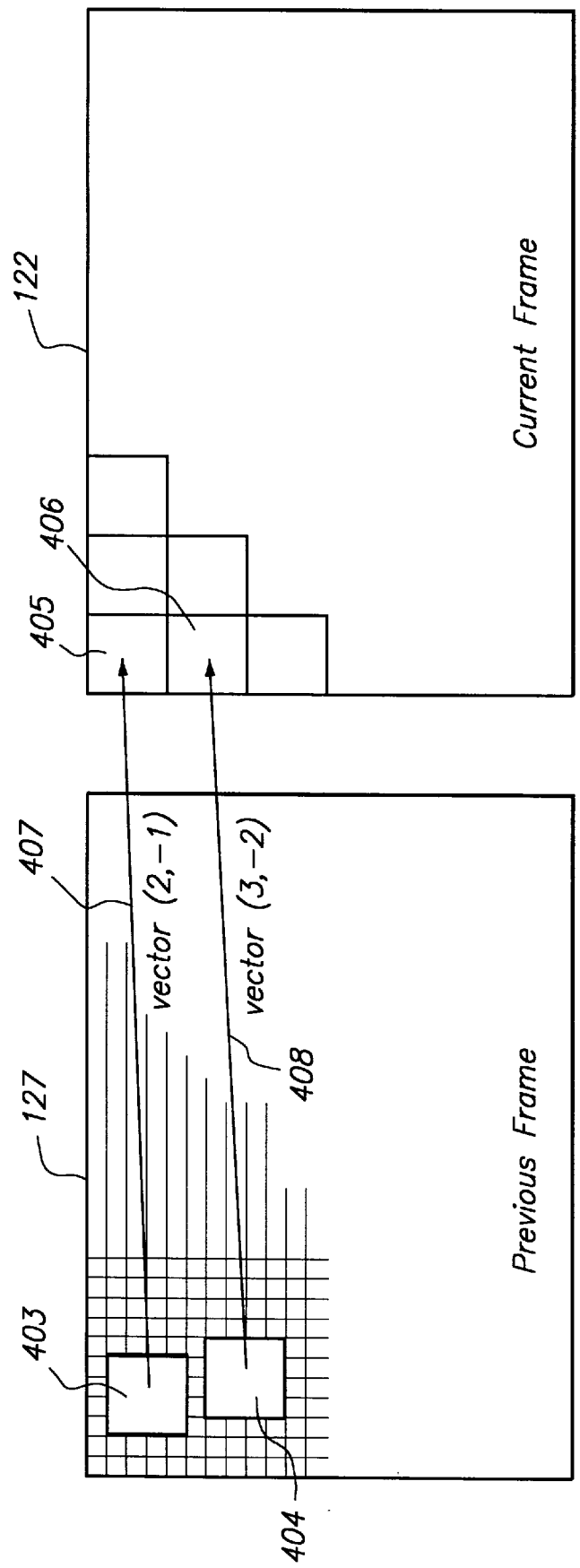
FIG. 4 is a pictorial illustration of motion vectors for relating a pixel block of a current video frame to a pixel group of a previous frame.

FIG. 4 is a pictorial illustration of motion vectors 407, 408 indicating the horizontal and vertical displacement between blocks in a current frame 122 and 4×4 pixel groups of a previous frame 127. Thus, motion vectors 407, 408 relate selected blocks 405, 406 of a current frame 122 to 4×4 pixel groups 403, 404 of a previous frame 127. As illustrated, motion vector 407 is a two element vector having values (2,−1). Motion vector 407 indicates that block 405 in current frame 122 is approximated by the 4×4 pixel group 403 of the previous frame starting two pixels to the right and one pixel down relative to the position of block 405. Similarly, motion vector 408 indicates that block 406 of current frame 122 is approximated by a pixel group (pixel group 404) three pixels to the right and two pixels down relative to the position of block 406.

Figure 5:
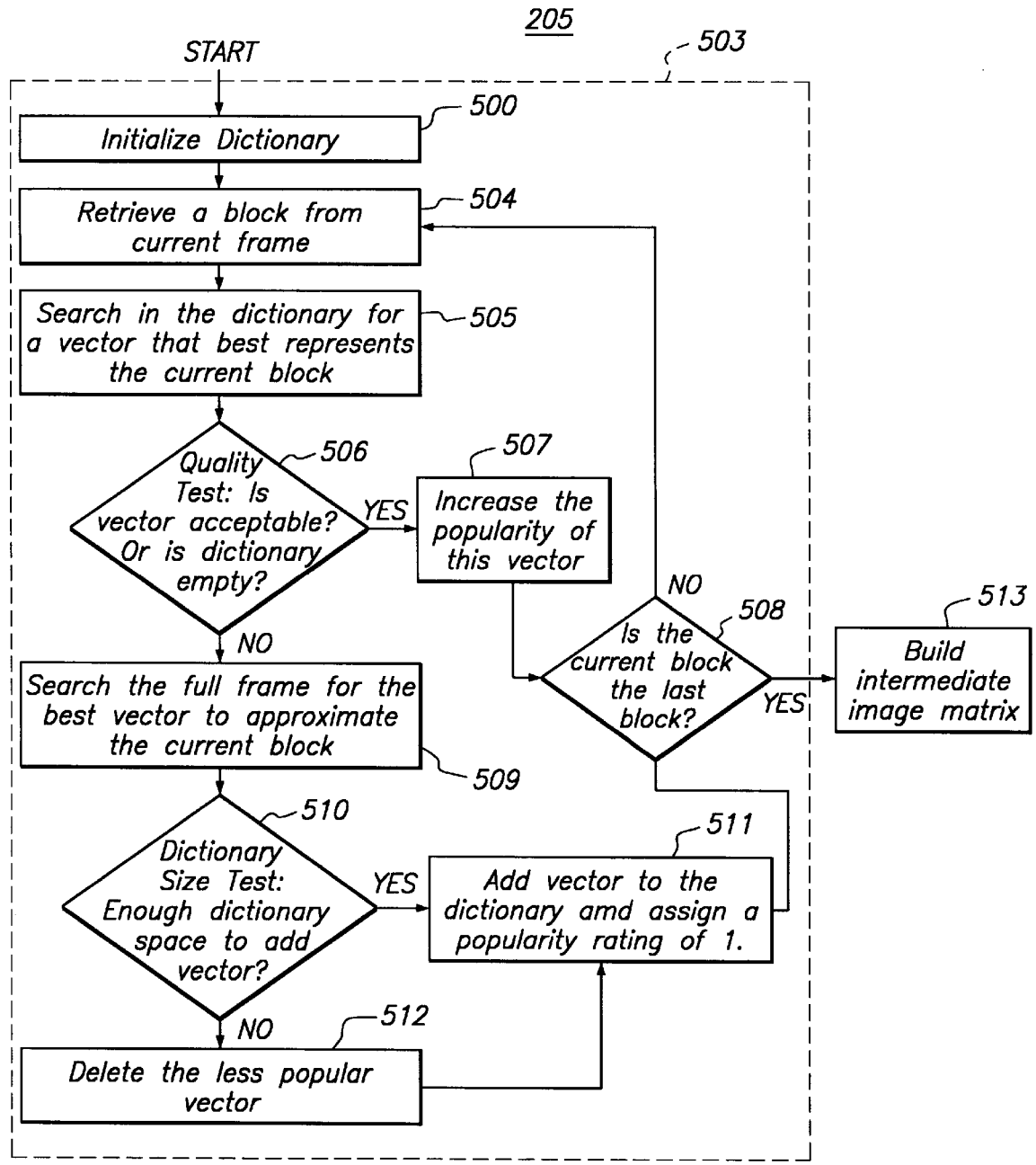
FIG. 5 is a flow diagram of a motion compensation compression method in accordance with the present invention.

FIG. 5 is a flow diagram of first lossy compression stage 205 which includes the steps of first constructing 503 motion vector dictionary 123 and then building 513 intermediate image matrix 126.

Specifically, the constructing step 503 includes the following steps, also illustrated in FIG. 5. Initializing step 500 is first performed to initialize the motion vector dictionary to an empty state (no entries). After initializing the dictionary, system 100 performs retrieving step 504 to retrieve a block from the current frame. Once a current block is retrieved, system 100 performs searching step 505. In searching step 505, system 100 searches the motion vector dictionary 123 for the motion vector that best represents the current block. If, however, the motion vector dictionary has no entries, for example just after initialization, then searching step 505 indicates that the dictionary is empty. When the motion vector dictionary is not empty, searching step 505 selects the best motion vector by first computing a sum of the squares error measure between each dictionary entry and the current block and by then selecting the dictionary entry which yields the smallest error measure.

The sum of the squares error measure performed in searching step 505 is an measure error measure between (i) the pixel values of the current frame block and (ii) the pixel values which would be generated on decompression using a given dictionary entry. Specifically, in the case of color image frames, the red, green and blue (R, G, B) values for each pixel of the current block are compared to the R, G, B values that will be assigned to each pixel in the block if the selected motion vector were to be used. For each, R, G and B pair, a difference is computed and squared. The R, G, and B squared differences are next summed to generate an error measure for each pixel. The squared difference measures for each pixel are summed to generate an overall error measure for the motion vector. Thus, the sum of the squares error measure is expressed by the following equation (equation (1)):

$$\text{Error} = \sum_{n=1}^{\text{\# of Pixels}} \begin{pmatrix} (R_{current}(n) - R_{previous}(n))^2 + \\ (G_{current}(n) - G_{previous}(n))^2 + \\ (B_{current}(n) - B_{previous}(n))^2 \end{pmatrix}$$

where:
n=the number of pixels in each block;
$R_{current}(n)$=the value of red color plane of the nth pixel of the current frame;
$R_{previous}(n)$=the value of red color plane of the nth pixel of the previous frame;
$G_{current}(n)$=the value of green color plane of the nth pixel of the current frame;
$G_{previous}(n)$=the value of green color plane of the nth pixel of the previous frame;
$B_{current}(n)$=the value of blue color plane of the nth pixel of the current frame; and
$B_{previous}(n)$=the value of blue color plane of the nth pixel of the previous frame.

This error measure quantifies the difference between the current block and the 4×4 pixel grid of the previous frame.

Using this sum of the squares error measure, searching step 505 selects the dictionary entry yielding the smallest error.

After searching step 505 is complete, testing step 506 is performed to determine whether the motion vector dictionary is empty, or if not empty, whether the vector selected in searching step 505 represents the current block with an adequate (acceptable) image quality. In the preferred embodiment, testing step 506 compares the sum of the squares error measure, as described above in reference to equation (1), to an image quality. Thus, test step 505 determines whether a given motion vector will represent the current block with an adequate image quality by computing a sum of the squares error measure between the pixel values of the frame block and the pixel values mapped from the previous frame. In the preferred embodiment, the criteria for acceptability is an image quality rating (error measure) of 8,112 or less. Other error measures may be used and other error tolerances may be selected to achieve different compression or decompression speeds, other compression ratios or to meet different image quality standards.

If testing step 506 determines that the image quality rating is acceptable, then system 100 performs incrementing step 507 to increment the popularity rating of the selected motion vector. After incrementing step 507, system 100 performs a test step 508 to determine whether the current block is the last block of the frame. If the current block is the last block, then dictionary construction 503 is complete and system 100 performs building step 513 to build an intermediate image matrix as described below. If, however, the current block is not the last frame block, then dictionary construction 503 is not complete and system 100 returns to retrieving step 504 and repeats the process until all of the blocks in the frame have been processed.

Now referring back to testing step 506, if testing step 506 indicates that either (i) the motion vector dictionary is empty or (ii) the best vector in the motion vector dictionary does not produce an acceptable image quality, system 100 performs the step of full frame searching 509 to search the previous frame for the optimal motion vector to represent the current block. Full frame searching step 509 uses the sum of the squares error measure described above in reference to equation (1) to select the optimal vector. After searching step 509, system 100 performs a dictionary size test step 510 to determine whether the motion vector dictionary has reached a maximum allocated size. Preferably, the motion vector dictionary is allocated a maximum size equal to 60% of the size allocated to the dictionaries (the motion vector dictionary, the VQ-4 dictionary and the VQ-16 dictionary) in total. The allocated dictionary size will vary depending on the particular hardware configuration and size of the random access memory space of the personal computer 103 implementing the method of the present invention. If test step 510 determines that the motion vector dictionary has reached its maximum allocated size, system 100 performs vector deletion step 512 before proceeding to add-vector step 511. Deletion step 512 searches the motion vector dictionary for the vector having the lowest popularity rating and deletes that vector thereby creating space for an additional motion vector. After deletion step 512, or if test step 510 indicates that there is sufficient space in the motion vector dictionary, system 100 proceeds to add-vector step 511. Add-vector step 511 adds the optimal vector to the dictionary without displacing any vectors currently in the dictionary. Add-vector step 511 additionally assigns a popularity rating of one to the newly added vector. System 100 next proceeds to test step 508 to determine whether the current block is the last block of the frame. If the current block is not the last frame block, then dictionary construction 503 is not complete and system 100 returns to retrieving step 504 and repeats the process until all of the blocks in the frame have been processed.

When test step 508 indicates that the current block is the last block, then motion vector dictionary construction 503 is complete and system 100 next performs the step of building 513 an intermediate image matrix 126. The intermediate image matrix 126 is a temporary representation of the current video frame and is updated during each stage of lossy compression. The intermediate image matrix 126 preferably contains a set of three entries for each image block: (i) the compression method, (ii) the dictionary index and (iii) the image quality rating. The compression method indicates which compression method is to be used to represent the associated block and thus corresponds to which dictionary is used on decompression. The dictionary index designates the dictionary entry assigned to represent the associated block. The image quality rating is the sum of the squares error as between the associated image block and the decompressed version which will result on decompression. The intermediate image matrix 126 is built and dynamically updated during compression as blocks are assigned to various dictionary entries.

Building step 513 builds the intermediate image matrix 126 by assigning, to each block, a best vector representation from the motion vector dictionary 123 built during the step of dictionary construction 503. The best vector is selected for each block by computing an image quality rating for each motion vector using the sum of the squares error calculation discussed above in reference to equation (1) and assigning the vector yielding the best quality rating. Thus, the intermediate image matrix 126 initially designates, for each block, motion compensation as the selected compression method and contains an index corresponding to the best motion vector in the motion vector dictionary 123. The intermediate image matrix 126 also preferably stores the computed image quality rating associated with the motion vector representation for each block.

Second Stage Lossy Compression

Referring now again to FIG. 2, once each block of the current frame has been assigned a motion vector (once first lossy compression stage 205 is complete), a second lossy compression stage 206 is performed to optimize the image quality within the memory constraints imposed by the target compression value. Image quality is optimized to a selected criteria, such as a quantitative measure of image quality. In the preferred embodiment, the selected criteria is the sum of the squares error measure expressed in equation (1) and discussed above in reference to the selection of the motion vectors. The principles of the present invention, however, apply with the use of other optimization criteria and other image quality measures.

In the preferred embodiment, the second lossy compression stage 206 uses vector quantization compression. Other lossy compression techniques, however, such as wavelet compression or discrete cosine transform techniques (including MPEG and JPEG) could alternatively be used in the second lossy compression stage 206.

Figure 6:
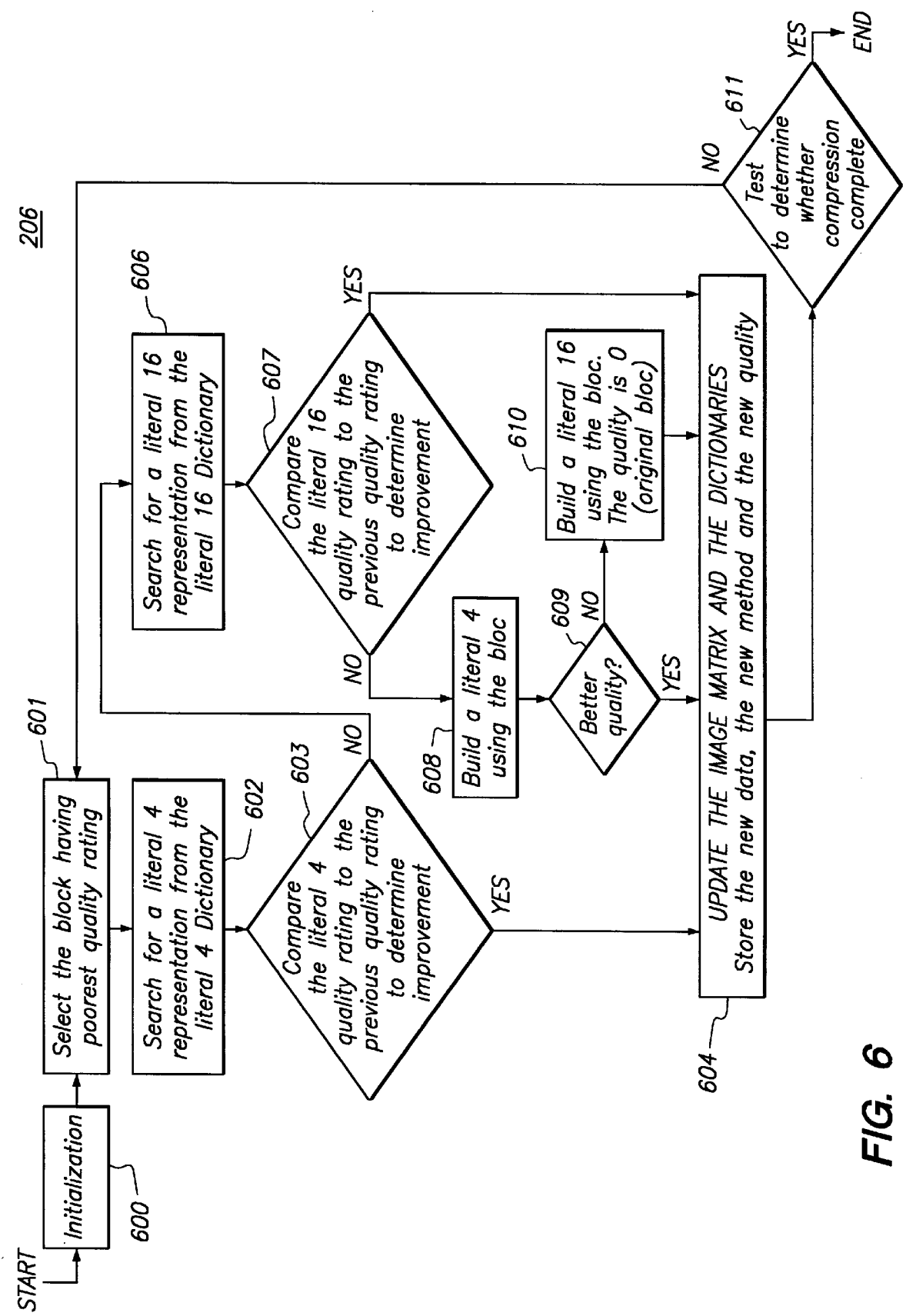
FIG. 6 is a flow diagram of a vector quantization compression method in accordance with the present invention.

There is illustrated in FIG. 6, a flow diagram of the steps included in the second lossy compression stage 206. Second lossy compression stage 206 is performed on selected blocks having the poorest image quality ratings. The second lossy compression stage 206 compresses selected blocks using an alternative compression technique to yield an improved image quality for the selected block and to thereby achieve an improved and more homogeneous overall image quality. The second lossy compression stage 206 builds two dictionaries: a VQ-4 dictionary 124 and a VQ-16 dictionary 125. Both dictionaries are preferably populated with entries optimized to best represent selected blocks of the current frame.

In accordance with the present invention, the second lossy compression stage 206 starts with initialization step 600. In initialization step 600, system 100 initializes the VQ-4 dictionary 124 and the VQ-16 dictionary 125 to an empty state (having no entries). After initialization step 600, system 100 proceeds to selecting step 601. In selecting step 601, system 100 searches the intermediate image matrix 126 and selects the block having the poorest image quality. The block having the poorest image quality rating is preferably selected by reading and comparing each of the image quality ratings stored in the intermediate image matrix 126.

The method next performs searching step 602. Searching step 602, searches the VQ-4 dictionary 124 to locate the literal-4 entry which yields the best image quality rating (using the sum of the squares error measure described above in reference to equation (1)) for the selected block. If, however, the VQ-4 dictionary 124 contains no entries, for example just after initialization step 600, searching step 602 will indicate that the VQ-4 dictionary 124 has no entries. After searching step 602, the method proceeds with comparison step 603.

In comparison step 603, the literal-4 image quality rating located in searching step 602 is then compared to the image quality rating currently stored in the intermediate image matrix. If the literal-4 representation improves the image quality then VQ-4 compression will replace motion vector compression for the selected block and thus the method proceeds to updating step 604 (described below). If however, the literal-4 representation does not improve the image quality or if there are no literal-4 entries in the VQ-4 dictionary 124, then the method proceeds to searching step 606.

Searching step 606, searches the VQ-16 dictionary 125 to locate the literal-16 entry which yields the best image quality rating (using the sum of the squares error measure described above in reference to equation (1) above) for the selected block. If, however, the VQ-16 dictionary 125 contains no entries, for example just after initialization step 600, searching step 606 will indicate that the VQ-16 dictionary 125 has no entries. After searching step 606, the method proceeds with comparison step 607.

In comparison step 607, the literal-16 image quality rating retrieved in searching step 606 is then compared to the image quality rating currently stored in the intermediate image matrix. If the literal-16 representation improves the image quality then VQ-16 compression will replace the current compression method assigned to the selected block and thus the method proceeds to updating step 604 (described below). If however, the literal-16 representation does not improve the image quality or if there are no literal-16 entries in the VQ-16 dictionary 125, then the method proceeds to building step 608.

Building step 608 builds a literal-4 representation of the currently selected block. After performing building step 608, the method next proceeds to comparison step 609. Comparison step 609 computes an image quality rating for the literal-4 representation to determine whether the literal-4 representation improves the image quality of the block. If the newly formed literal-4 improves the image quality, then VQ-4 compression is selected for the current block and the method proceeds to updating step 604 (described below). If however, the newly formed literal-4 does not improve the image quality, then the method proceeds to building step 610. In building step 610, system 100 builds a literal-16 representation of the selected block. Because the selected block is a 16 by 16 pixel block, the literal-16 representation yields a perfect image quality rating. After completing building step 610, the method proceeds to updating step 604.

Updating step 604 updates both the intermediate image matrix 126 and the dictionaries 123, 124 and 125. The intermediate image matrix 126 is updated by storing (i) the newly selected compression method (i.e. VQ-4 or VQ-16), (ii) the new dictionary index and (iii) the new image quality rating. Updating step 604 also updates the appropriate dictionaries. The dictionaries are updated by first decrementing the popularity rating associated with the dictionary entry previously selected for the current block and incrementing the popularity rating for the newly assigned dictionary entry. Updating step 604 then tests the decremented popularity rating to determine whether the popularity rating is now zero, meaning that no blocks are now assigned to the dictionary entry. If updating step 604 determines that the dictionary entry has a zero popularity rating, that entry is deleted from the corresponding dictionary, otherwise the entry remains in the dictionary. If the newly assigned dictionary entry is also a newly created entry, then the entry is added to the appropriate dictionary and assigned a popularity rating of one.

After updating step 604, the method proceeds to testing step 611. Testing step 611 tests the memory allocation and image quality to determine whether frame compression is complete. System 100 determines that frame compression is complete if either the image quality for each block meets a specified image quality threshold or if there is insufficient memory to continue second stage lossy compression. In the preferred embodiment, the image quality threshold is set to a "perfect" image quality rating, meaning that the sum of the squares error measure between the original block and the decompressed version is zero. The sufficiency of the available memory is determined using a "worst case" memory analysis. The worst case analysis is performed by computing the size of the compressed frame which would result from the current intermediate image matrix with an additional VQ-16 dictionary entry. If this "worst case" compressed file size would exceed the target file size as dictated by the target compression value, then the process of the second lossy compression stage 206 stops. If, however, the "worst case" compressed file size would not exceed the target file size as dictated by the target compression value, then the process of the second lossy compression stage 206 proceeds to selecting step 601 to repeat the process. Thus, the method illustrated in FIG. 6 is repeated, continually improving the image reproduction quality of the image frame until system 100 determines in test step 611 that there is insufficient memory to continue second lossy compression stage 206 or that a threshold image quality has been achieved.

Building the Compressed Frame

Figure 7:
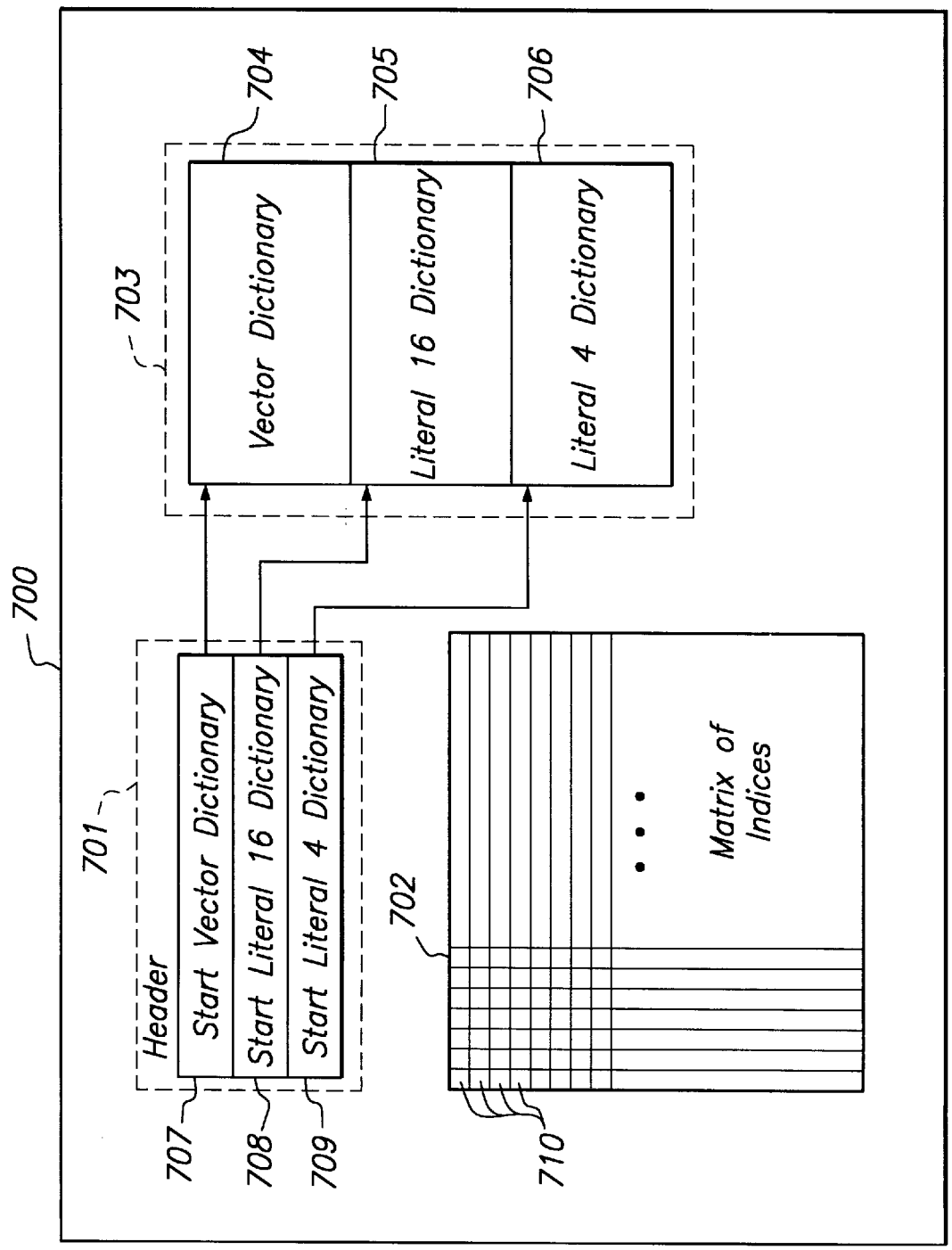
FIG. 7 is a block diagram illustrating the format of a compressed video frame.

Referring now again to FIG. 2, after lossy compression step 203 is complete, system 100 proceeds to building step 207. Building step 207 builds a compressed frame using the intermediate image matrix 126 and dictionaries 123, 124 and 125. FIG. 7 illustrates a compressed frame 700 built in building step 207. Compressed frame 700 has a header 701, a matrix 702 of indices 710, and a set of dictionaries 703. Compressed frame 700 contains the three dictionaries 123, 124 and 125 constructed during lossy compression step 203. Each dictionary (motion vector dictionary 704, VQ-16 dictionary 705 and VQ-4 dictionary 706) contains sequentially (contiguously) stored elements (entries). Additionally, the dictionaries themselves 704, 705 and 706 are preferably stored sequentially (contiguously) in compressed frame 700.

Header 701 contains a "start motion vector dictionary" pointer 707, a "start VQ-16 dictionary" pointer 708 and a "start VQ-4 dictionary" pointer 709. Each pointer indicates the starting offset of the respective dictionaries in compressed frame 700. Compressed frame 700 additionally has a matrix 702 of indices having an index 710 for each block. Each index 710 is an index into the sequentially stored dictionaries and corresponds to the particular compression method and dictionary entry selected for the associated frame block. Thus, any block having an index 710 greater than or equal to the "start vector dictionary" pointer 707 but less than "start VQ-16 dictionary" pointer 708 is represented using motion compensation compression. Similarly, any block having an index in the range between "start VQ-16 dictionary" pointer 708 and "start VQ-4 dictionary" pointer 709 is represented using literal-16 vector quantization and any block having an index greater than "start VQ-4 dictionary" pointer 709 is represented using literal-4 vector quantization. Because header 701 contains the information required to decode the compression method associated with each frame block, the compression method is implicitly stored in the index information thereby reducing the amount of information required to store the video frame. Additionally, the matrix 702 of indices 710 is preferably stored in a compact form where each index 710 does not necessarily adhere to byte or word boundaries. For example, if the dictionaries can be fully addressed using only five bits, then each index 710 is represented using only five bits. Therefore, building step 207 performs bit operations to build the matrix of indices 702 in a compacted form.

After building step 207, the method proceeds to constructing step 210. Constructing step 210 stores a compressed frame 700 in a lossy chunk and a key frame (compressed in compression step 208) in a key chunk. The lossy chunk and key chunk construction methods performed in constructing step 209 are discussed separately below.

Constructing a Lossy Chunk

To form a lossy chunk, constructing step 210 adds a header to compressed frame 700. The lossy chunk header preferably contains the following information:

a chunk identifier;

the chunk size, inclusive of the header;

the number of elements in the motion vector dictionary;

the number of elements in the literal 4 dictionary;

the number of elements in the literal 16 dictionary; and the number of bits in the matrix of indices.

Constructing a Key Chunk

To form a key chunk, constructing step 210 adds a header to the frame compressed in lossless compression step 208. The key chunk header preferably contains the following information:

a chunk identifier identifying the chunk has having a key frame;

a chunk size parameter indicating the size of the chunk, including both the header and the frame;

a frame width parameter indicating the width of the video frame in pixels;

a frame height parameter indicating the height of the video frame in pixels;

a palette size parameter indicating the number of colors in the palette; and a palette (color table) having the number of colors specified by the palette size parameter.

II. DECOMPRESSION

Figure 8:
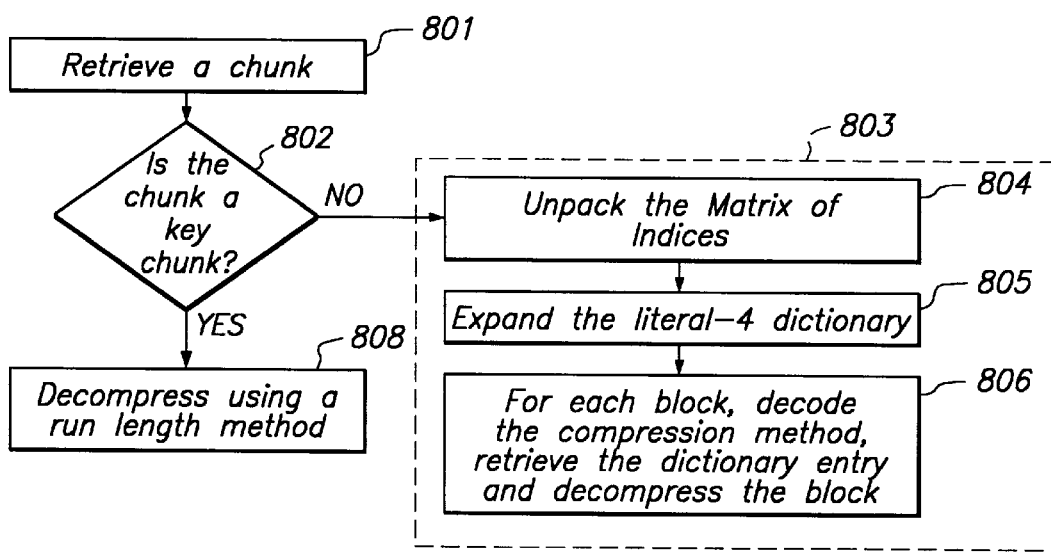
FIG. 8 is a flow diagram of a decompression method in accordance with the present invention.

FIG. 8 illustrates a method of decompressing a compressed image frame of a video sequence. In accordance with the method, system 100 first performs retrieving step 801. Retrieving step 801, retrieves a chunk for decompression. The method next performs testing step 802 to determine whether the retrieved chunk is a key chunk. Preferably testing step 802 determines whether the retrieved chunk is a key chunk by reading the chunk header information. If testing step 802 determines that the retrieved chunk is a key chunk, the method proceeds to decompression step 808. Decompression step 808 decompresses the frame data stored in the key chunk in accordance with the lossless compression technique used to compress the key frame data. If however, testing step 802 determines that the retrieved chunk is a lossy chunk, the method proceeds to decompression step 803.

Decompression step 803 first performs unpacking step 804 followed by expansion step 805. In unpacking step 804, the method uses bit operations to expand the matrix 702 of indices into a format aligned on byte or word boundaries. In expanding step 805, the method expands the literal-4 entries into 16 by 16 pixel entries. The expanded literal-4 entries are stored for use during decompression step 806. After performing the unpacking step 804 and the expanding step 805, the method proceeds to decompression step 806. In decompression step 806, the frame header 701 is retrieved and each block is decompressed. Decompression step 806 retrieves the unpacked index associated with each block, decodes the compression technique (motion vector compression, VQ-4 compression or VQ-16 compression) and retrieves the corresponding dictionary entry. The compression technique is decoded by comparing the block index to the dictionary pointers ("start motion vector dictionary" pointer 707, "start VQ-16 dictionary" pointer 708 and "start VQ-4 dictionary" pointer 709) stored in header 701. Each pointer indicates the starting offset of the respective dictionaries in compressed frame 700. Then using the dictionary entry, decompression step 806 decompresses the block using the decompression technique matched to the decoded compression technique. Therefore, in accordance with the present method, the frame blocks are decompressed using a plurality of decompression techniques.

Thus, system 100 compresses each frame of frame sequence 102 using either a lossy or a lossless compression technique dependent on whether the particular frame is designated a key frame. After compression of each frame, system 100 formats the compressed frame into a chunk format and writes the chunk to the compressed file. Thus, a frame sequence is represented by a compressed file comprising a plurality of chunks, some of which are key chunks. Together, the chunks and the key chunks form a compressed version of the video sequence. A personal computer programmed in accordance with the present invention, (or a dedicated decompressor or a "player") receives the compressed frame sequence, reads each chunk header to determine whether each chunk is a key chunk and decompresses each frame accordingly. Frames which are not key frames are decompressed on a block-by-block basis using the appropriate decompression method, either motion compensation or vector quantization using either the literal-4 or literal-16 dictionary.

Thus, by combining a plurality of image compression techniques in accordance with the present invention, video sequences are compressed efficiently and produce a homogeneous effect across each frame on decompression.

What is claimed is:

1. A method of compressing an image frame having a target compression ratio and an allocation of memory to produce a homogeneous image quality across the frame, comprising:

dividing at least a portion of the image frame into a plurality of blocks, each block being an uncompressed version of the block;

performing a first compression method on a plurality of the blocks to form a plurality of first compressed versions of the blocks having an overall compression ratio exceeding the target compression ratio;

determining an image quality rating for each compressed version of each block;

identifying a block in the image frame having the poorest image quality rating, performing a second compression method on the identified block to create a second compressed version of the block, comparing the first and second compressed versions of the block to determine which has a better image quality rating;

performing a third compression method on said block responsive to determining that the first compressed version has a better image quality rating than the second compressed version, performing a comparison between the first compressed version of said block and the third compressed version of said block to determine which has a better image quality rating; and replacing the first compressed version of the block with the second compressed version of the block in the image frame responsive to determining that the second compressed version has a better image quality rating, otherwise replacing the first compressed version with the third compressed version in the image frame if the third compressed version has a better image quality rating;

determining the amount of memory used by the image frame;

repeatedly identifying a block in the image frame having the poorest image quality, performing a second compression, comparing the first and second versions, performing a third compression method, performing a comparison between the first and third versions, replacing the first compressed version, and determining the amount of memory, until the memory used by the image frame approximates the amount of memory allocated for the image frame.

2. The method of claim 1 wherein the third compression method is a literal-16 representation of the uncompressed version of the block.

3. The method of claim 1 wherein the compression ratio of the second compression method is less than the compression ratio of the first compression method.

4. The method of claim 1 wherein the compression ratio of the third compression method is less than the compression ratio of the second compression method.

5. A method for compressing an image frame that is divided into a plurality of blocks the image frame having a target compression ratio and a memory allocation, comprising:

overcompressing the blocks using a first compression method to generate a first compressed version of the blocks such that the compression ratio of the image frame exceeds the target compression ratio;

selecting a block in the image frame with a poorest image quality;

performing a second compression on said block to generate a second compressed version of the selected block, comparing the image quality of the first compressed version of the block with the image quality of the second compressed version of said block;

selecting the second version of the block in response to the second version having a better image quality;

performing a third compression on said block responsive to determining that the first compressed version of the block has a better image quality than the second compressed version of the block;

comparing the image quality of the third compressed version of the block with the image quality of the first compressed version of the block;

selecting the version with the better image quality to be used in the image frame; and determining the amount of memory occupied by the image frame with the selected version of the block, repeating the selecting a block, performing a second compression, comparing the image quality of the first compressed version, selecting the second version, performing a third compression, comparing the image quality of the third compressed version, selecting the version with the better image quality, and determining the amount of memory stops until the memory used by the image frame approximates the amount of memory allocated for the image frame.

6. The method of claim 5 wherein the third compression method uses a literal-16 representation.

7. The method of claim 5 wherein the third compression method is performed using a smaller compression ratio than the second compression method.

* * * * *